United States Patent
Bak

(12) 
(10) Patent No.: US 8,182,947 B2
(45) Date of Patent: May 22, 2012

(54) ELECTRODE ASSEMBLY AND LITHIUM ION SECONDARY BATTERY HAVING THE SAME

(75) Inventor: Hyo-Rim Bak, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 433 days.

(21) Appl. No.: 12/412,765

(22) Filed: Mar. 27, 2009

(65) Prior Publication Data

US 2009/0246640 A1    Oct. 1, 2009

(30) Foreign Application Priority Data

Mar. 27, 2008  (KR) ........................ 10-2008-0028325

(51) Int. Cl.
*H01M 4/66* (2006.01)

(52) U.S. Cl. .................. 429/246; 429/218.1; 429/248

(58) Field of Classification Search .............. 429/218.1, 429/246, 248
See application file for complete search history.

(56) References Cited

U.S. PATENT DOCUMENTS

| 7,279,251 | B1 * | 10/2007 | Yun et al. ................... 429/247 |
| 2006/0008700 | A1 * | 1/2006 | Yong et al. .................. 429/144 |

FOREIGN PATENT DOCUMENTS

| JP | 8-188481 | 7/1996 |
| JP | 9-139201 | 5/1997 |
| KR | 2004-105370 | 12/2004 |
| KR | 2006-102251 | 9/2006 |
| KR | 10-2007-0105725 | 10/2007 |

* cited by examiner

*Primary Examiner* — Stuart Hendrickson

(74) *Attorney, Agent, or Firm* — Knobbe Martens Olson & Bear LLP

(57) ABSTRACT

An electrode assembly includes a positive electrode including a positive electrode active material; a negative electrode including a negative electrode active material; and a separator separating the positive electrode and the negative electrode from each other, and the separator including a porous layer formed by a combination of a barium titanate ($BaTiO_3$) and a binder.

19 Claims, No Drawings

ELECTRODE ASSEMBLY AND LITHIUM ION SECONDARY BATTERY HAVING THE SAME

CROSS-REFERENCE TO RELATED APPLICATION

This application claims the benefit of Korean Patent Application No. 2008-28325, filed Mar. 27, 2008, in the Korean Intellectual Property Office, the disclosure of which is incorporated herein by reference.

BACKGROUND OF THE INVENTION

1. Field of the Invention

Aspects of the present invention relate to an electrode assembly and a lithium secondary battery having the same, and more particularly, to a lithium secondary battery that is excellent in battery safety and battery performance.

2. Description of the Related Art

As portable electronic products that are small in size and light in weight are rapidly developed, it is desirable that the batteries used as power sources for driving the electronic products be small and have a high capacity. Specifically, a lithium secondary battery has an operating voltage of 3.6V or more, which is three times higher than that of a nickel cadmium battery or a nickel metal hydride battery, which are commonly used as power sources of portable electronic products. Furthermore, a lithium secondary battery has a high energy density per unit weight. Due to these reasons, lithium secondary batteries are being rapidly developed.

A lithium secondary battery generates electric energy by an oxidizing or reducing reaction when lithium ions are intercalated/deintercalated in positive/negative electrodes. A lithium secondary battery is manufactured by using materials that are capable of reversely intercalating/deintercalating lithium ions as active materials of the positive/negative electrodes and by charging an organic electrolyte or a polymer electrolyte between the positive electrode and the negative electrode.

Typically, a lithium secondary battery comprises an electrode assembly, a can and a cap assembly. The electrode assembly is formed of a negative electrode plate, a positive electrode plate and a separator between the negative electrode plate and the positive electrode plate, which are rolled in a predetermined shape, such as, for example, a jelly-roll shape. The can receives the electrode assembly and an electrolyte and the cap assembly is assembled on the cap.

The positive electrode plate of the electrode assembly is electrically connected to the cap assembly through a positive electrode lead, and the negative electrode plate of the electrode assembly is electrically connected to the can through a negative electrode lead.

The separator of the lithium secondary battery functions to prevent a short circuit by separating the positive electrode from the negative electrode and maintains high ion conductivity by storing the electrolyte required for a battery reaction. Specifically, in a lithium secondary battery, it is desirable to prevent movement of a material that obstructs the battery reaction and to secure the safety of the battery when an abnormality occurs. The separator typically uses a material such as a polyolefin based micro-porous high molecular layer such as polypropylene, polyethylene or the like, or a multi-layer thereof. In a conventional separator, since a porous layer is in the form of a sheet or film, pores of the porous layer may become blocked or the separator may contract by the generation of heat caused by an internal short circuit or over-charging. Therefore, when the sheet-type separator contracts and shrinks by the generation of heat inside the battery, the positive electrode and the negative electrode may contact each other directly where the separator and contracted or shrunk, and a fire, bursting or explosion may result.

Further, in a conventional film-type separator, when heat is generated by a short circuit, polypropylene or polyethylene resin softens to block pores, so that stability is secured by the shutdown function of interrupting the movement of lithium ions, that is, the flow of a current. However, the conventional film-type separator has a weak structure with respect to an internal short circuit. For example, in a nail test (to perforate through a battery using a nail) which is a substitution evaluation modeling an internal short circuit, since the heat generated upon an internal short circuit locally exceeds several hundreds ° C., depending on test conditions, a deformation of the porous layer occurs by the softening or loss of the resin. Then, when the nail perforates through the positive electrode and the negative electrode, abnormal over-heating occurs. Therefore, the shutdown effect of the resin is not an absolutely reliable safeguard against an internal short circuit.

Further, in the film-type separator, lithium dendrites result from over-charging. Since the separator is in the form of a film, a gap may occur between the negative electrode and the film and thus, lithium ions that do not enter inside the negative electrode accumulate on the surface of the negative electrode, that is, in the gap between the negative electrode and the film, and are deposited in the form of lithium metal dendrites. The deposited lithium dendrite pose a risk of perforating the film-type separator. If this happens, the positive electrode may contact the negative electrode or simultaneously, the lithium metal may undergo a side reaction with the electrolyte. Then, the battery may catch fire or explode by the heat and gas generated from the side reaction.

Moreover, when the film-type separator becomes mis-aligned due to vibration or falling, the separator cannot perform its intended function of separating the positive electrode from the negative electrode. As a result, the positive electrode contacts the negative electrode, causing a short circuit. Consequently, the battery cannot function. Moreover, when assembling a battery, mis-winding may occur, resulting in an increased rate of poor products and causing a problem of manufacturing stability. Moreover, since the film melts at a temperature of 100° C. or more, the film-type separator cannot be used at a high temperature.

To overcome the aforementioned problems of the film-type separator, research has been actively conducted to develop a ceramic separator that includes a porous layer formed by combining the ceramic material, such as silica ($SiO_2$), alumina ($Al_2O_3$), zirconium oxide ($ZrO_2$) or titanium oxide ($TiO_2$), and a binder.

However, even when a ceramic material such as silica ($SiO_2$), alumina ($Al_2O_3$), zirconium oxide ($ZrO_2$) or titanium oxide ($TiO_2$) is used as a separator, there is still a risk of an internal short circuit or combustion of the negative electrode active material.

SUMMARY OF THE INVENTION

Therefore, aspects of the present invention provide a lithium secondary battery that is excellent with respect to the safety of a battery and the performance of a battery.

Aspects of the present invention further provide an electrode assembly that comprises a separator comprising a ceramic material having a high thermal absorption rate, to improve the safety of a battery, and a lithium secondary battery having the same.

Aspects of the present the present invention further provide an electrode assembly comprising a separator comprising a ferroelectric ceramic material, to improve the performance of a battery, and a lithium secondary battery having the same.

According to an embodiment of the present invention, an electrode assembly comprises a positive electrode including a positive electrode active material; a negative electrode including a negative electrode active material; and a separator separating the positive electrode and the negative electrode from each other. The separator comprises a porous layer comprising a combination of a ceramic material and a binder, and the ceramic material is barium titanate ($BaTiO_3$).

According to an embodiment of the present invention, a lithium secondary battery comprises a positive electrode, a negative electrode, a separator separating the positive electrode and the negative electrode from each other and an electrolyte. The separator comprising a porous layer comprising a combination of a ceramic material and a binder, and the ceramic material is barium titanate ($BaTiO_3$).

According to an embodiment of the present invention, an electrode assembly comprises a positive electrode including a positive electrode active material; a negative electrode including a negative electrode active material; and a separator separating the positive electrode and the negative electrode from each other. The separator comprises a porous layer comprising a combination of a first ceramic material, a second ceramic material and a binder, and the first ceramic material is barium titanate ($BaTiO_3$).

According to another embodiment of the present invention, a lithium secondary battery comprises a positive electrode, a negative electrode, a separator separating the positive electrode and the negative electrode from each other and an electrolyte. The separator comprises a porous layer comprising a combination of a first ceramic material, a second ceramic material and a binder, and the first ceramic material is barium titanate ($BaTiO_3$).

According to another embodiment of the present invention, an electrode/separator structure comprises an electrode including an electrode active material layer; and a separator formed on the electrode active material, including a porous layer comprising a ceramic material and a binder, wherein the ceramic material is a material that undergoes a transition from being ferroelectric to being paraelectric and having a reduced dielectric constant at a temperature of about 120° C. or greater.

According to another embodiment of the present invention, an electrode/separator structure comprises an electrode including an electrode active material layer; and a separator formed on the electrode active material, including a porous layer comprising a first ceramic material, a second ceramic material and a binder, wherein the ceramic material is a material that undergoes an endothermic reaction at a temperature of about 120° C. or greater.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrode assembly comprising a separator according to aspects of the present invention and a secondary battery having the electrode assembly will be described below:

The separator according to aspects of the present invention comprises a porous layer resulting from a combination of a ceramic material including barium titanate ($BaTiO_3$) and a binder.

Barium titanate ($BaTiO_3$) is a ferroelectric oxide that has a phase transition such that the oxide has a hexagonal structure when its temperature is 1460° C. or less and a perovskite structure when its temperature is 1460° C. or more.

Further, barium titanate ($BaTiO_3$) has a cubic structure with paraelectric properties at a temperature of 120° C. or more and a tetragonal structure with ferroelectric properties at a temperature of 120° C. or less.

In other words, the temperature at which the properties of barium titanate ($BaTiO_3$) changes from being paraelectric to being ferroelectric, (that is, the Curie temperature (Tc)), is about 120° C. The dielectric constant indicating electric properties increases as a temperature increases. The dielectric constant has the maximum value at the Curie temperature (Tc) but it decreases as a temperature increases in a paraelectric domain above the Curie temperature (Tc).

Therefore, since barium titanate ($BaTiO_3$) has ferroelectric properties below 120° C., the ion conductivity increases in this range to improve the performance of the battery. Further, since barium titanate ($BaTiO_3$) loses ferroelectric properties above 120° C., the safety of the battery is improved at high temperatures.

According to a differential scanning calorimetry (DSC) analysis, barium titanate ($BaTiO_3$) undergoes an endothermic reaction at a temperature of about 120° C., specifically, about 128° C. to 129° C. Since barium titanate ($BaTiO_3$) has this characteristic, the limit value of thermal runaway can be increased through the endothermic reaction when a temperature inside the battery is increased by an abnormal condition of the battery.

The porous layer resulting from the combination of the ceramic material and the binder may include only barium titanate ($BaTiO_3$) as the ceramic material, or the porous layer may further include at least one material selected from the group consisting of silica ($SiO_2$), alumina ($Al_2O_3$), zirconium oxide ($ZrO_2$) and titanium oxide ($TiO_2$) which are conventional ceramic materials. The porous layer may further include an insulating nitride, a hydroxide or a ketone compound of zirconium, aluminum, silicon or titanium, or a mixture of these compounds. (A conductive nitride such as titanium nitride (TiN) or the like is not used.)

According to aspects of the present invention, when the ceramic material includes the mixture of barium titanate ($BaTiO_3$) and the conventional ceramic material, the amount of barium titanate ($BaTiO_3$) may be, as a non-limiting example, more than 50 wt % and less than 100 wt % based on the total amount of the ceramic material.

When barium titanate ($BaTiO_3$) less than 50 wt %, based on the total amount of the ceramic material, is used, the effect of improving the safety and performance of the battery according to aspects of the present invention may be insufficient. Of course, it is to be understood that the conventional ceramic material may be omitted, in which case, the amount of barium titanate is 100 wt %. When the amount of barium titanate ($BaTiO_3$) is 100 wt % of the ceramic material, the safety and performance of the battery does not decrease.

The binder may be a synthetic rubber latex binder or an acryl-based rubber having a cross-linked structure.

The synthetic rubber latex binder may comprise at least one or more selected from the group consisting of styrene butadiene rubber (SBR) latex, nitrile butadiene rubber (NBR) latex, methyl methacrylate butadiene rubber latex, chloroprene rubber latex, carboxy modified styrene butadiene rubber latex, and modified polyorganosiloxane based polymer latex. For example, the synthetic rubber latex binder may be a high molecular latex that includes an aqueous dispersant. The amount of the high molecular latex to be used may be 0.1 to 20 parts by weight in solid powder based on 100 parts by weight of the ceramic material. When the amount of the high molecular latex is less than 0.1 parts by weight, the adhesive strength to an electrode or to the polyolefin-based resin layer may be not good. When the amount of the high molecular latex is more than 20 parts by weight, the characteristics of the battery may be affected.

The acryl-based rubber having a cross-linked structure may be formed by the cross-linking reaction of a polymer or copolymer of an acrylic major monomer and a cross-linkable comonomer. When only one of the polymer and copolymer of the acrylic major monomer is used, the binding structure may be weak and easily broken. However, when the cross-linkable monomer is added to the polymer or copolymer of the acrylic major monomer, the cross-linkable monomer binds with the polymer or copolymer structure of the acrylic major monomer, to form a stronger net structure. As the molecule weight of the acryl-based rubber increases through cross-linking, the resistance to swelling in a solvent increases. The acryl-based rubber binder having the aforementioned cross-linking structure may be formed to have a three-dimensional structure with 2 to 10 cross-linking points, or more specifically, 4 to 5 cross-linking points, with respect to 10,000 molecular weight units of a main chain molecule. Therefore, the acryl-based rubber having the cross-linking structure according to aspects of the present invention has good resistance to swelling in the electrolyte.

The ceramic material may have a decomposition temperature of 1000° C. or more. Further, the acryl-based rubber binder having the cross-linked structure may have a decomposition temperature of 250° C. or more. Therefore, the battery may have a high thermal resistance, which results in increased safety against an internal short circuit.

The acrylic major monomer may be at least one selected from the group consisting of: an alkoxyalkyl acrylate selected from the group consisting of methoxymethyl acrylate, methoxyethyl acrylate, ethoxyethyl acrylate, butoxyethylacrylate, methoxyethoxyethyl acrylate and dicyclopentenyloxyethyl acrylate; an alkenyl acrylate or alkenyl methacrylate selected from the group consisting of vinyl methacrylate, vinyl acrylate, allyl methacrylate, 1,1-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from the group consisting of divinyl itaconate and divinyl maleate; a vinyl group containing ether selected from the group consisting of vinyl 1,1-dimethylpropenyl ether and vinyl 3,3-dimethylbutenyl ether; 1-acryloyloxy-1-phenylethene; and methyl methacrylate.

The cross-linkable comonomer may be at least one selected from the group consisting of: an alkyl acrylate selected from the group consisting of 2-ethylhexyl acrylate, methyl acrylate, ethyl acrylate, propyl acrylate, butyl acrylate, octyl acrylate and iso-octyl acrylate; an alkenyl chloroacetate selected from the group consisting of vinyl chloroacetate and acryl chloroacetate; a glycidyl group containing an ester or an ether selected from the group consisting of glycidyl acrylate, vinylglycidyl ether and acryl glycidyl ether; an unsaturated carboxylic acid selected from the group consisting of acrylic acid, methacrylic acid and maleic acid; 2-chloroethyl vinyl ether; chloromethyl styrene; and acrylonitrile.

As a non-limiting example, the amount of the binder may be 5 to 20 wt % based on the total amount of the porous layer formed by the combination of the ceramic material and the binder.

The binder binds the ceramic powder and/or binds a ceramic layer and an active material layer. When the amount of the binder is less than 5 wt %, the flexibility of the ceramic layer decreases and the binding force of the ceramic layer may be insufficient, such that the ceramic layer may be easily scratched. When the amount of the binder is more than 20 wt %, the pores between the ceramic powders may be blocked, interrupting the smooth movement of lithium ions and decreasing the capacity of the battery.

The electrode assembly of the secondary battery further includes a positive electrode and a negative electrode.

The positive electrode includes a positive electrode active material that reversely intercalates and deintercalates lithium ions. Typical examples of the positive electrode active material include a lithium-transition metal oxide, such as $LiCoO_2$, $LiNiO_2$, $LiMnO_2$, $LiMn_2O_4$, or $LiNi_{1-x-y}Co_xMyO_2$ ($0 \leq x \leq 1$, $0 \leq y \leq 1$, $0 \leq x+y \leq 1$, M is a metal such as Al, Sr, Mg, La or the like). It is to be understood that the positive electrode active material is not limited to these examples.

The negative electrode includes a negative electrode active material that intercalates and deintercalates lithium ions. The negative electrode active material may be a carbon-based negative active material, such as crystalline or amorphous carbon or a carbon composite. It is to be understood that the negative electrode active material is not limited to these examples.

To form the porous layer, a paste is made by mixing the ceramic material and the binder in the solvent. The positive electrode, the negative electrode or both positive and negative electrodes are coated with the paste. The porous layer may function by itself as a film-type separator by itself. Alternatively, the porous layer together with a film-type separator composed of polyethylene (PE), polypropylene (PP) or the like may function together as a separator.

The thickness of the porous layer may be controlled to be 1 to 40 μm, or more specifically, 5 to 20 μm, considering the ion conductivity and the energy density. When the thickness of the porous layer is less than 1 μm, the intensity is likely to decrease. A thickness of the porous layer more than 40 μm is disadvantageous to the energy density.

After the porous layer is formed on the positive electrode, the negative electrode or both positive and negative electrodes, two electrodes are stacked or stacked and thereafter wound, to form an electrode assembly. As described above, since the porous layer may function as a separator by itself, an additional separator does not need to be positioned between the two electrodes. a conventional film-type separator has the problem in that it contracts at high temperatures, but the porous layer does not contract or melt at high temperatures. In the conventional polyolefin-based film-type separator, a part of the film may be damaged by heat generated initially when an internal short circuit occurs, and the film around the damaged part may then continuously contract or melt, resulting in a larger portion of the film-type separator burning and disappearing. As a result, a more severe short circuit may occur. However, in the electrode on which the porous layer is formed, a part where an internal short circuit occurs is only damaged a little bit and the damaged part does not further increase. Further, since the electrode with the porous layer undergoes a less severe short circuit not a more severe short circuit to continuously consume an over-charging current, the battery maintains a constant voltage between 5 to 6V and a battery temperature of 100° C. or less, improving the stability of the battery to over-charging.

Specifically, in the present invention, since barium titanate ($BaTiO_3$), which is a ferroelectric material, is used as the ceramic material, the ion conductivity increases to improve the performance of the battery. Furthermore, since barium titanate ($BaTiO_3$) has the characteristics of losing electric properties at 120° C. or more and undergoes an endothermic reaction at about 120° C., the safety of the battery is improved.

The secondary battery further comprises an electrolyte. The electrolyte includes a non-aqueous organic solvent. The non-aqueous organic solvent may be a carbonate, ester, ether or ketone. The carbonate may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) or the like. The ester may be butyrolactone (BL), decanolide, valerolactone, mevalonolactone, caprolactone, n-methyl acetate, n-ethyl acetate, n-propyl acetate or the like. The ether may be dibutyl ether or the like. The ketone may be polymethylvinyl ketone. However, it is to be understood that the non-aqueous organic solvent is not limited to these examples.

When the non-aqueous organic solvent is a carbonate-based organic solvent, a mixture of a cyclic carbonate and a chain carbonate may be used. In this case, the cyclic carbonate and the chain carbonate may be mixed in a volume ratio of the cyclic carbonate to the chain carbonate of, for example, 1:1 to 1:9, or more specifically, 1:1.5 to 1:4. When the cyclic carbonate and the chain carbonate are mixed in the above-defined volume ratio, a desirable performance of the electrolyte is obtained.

The electrolyte may further comprise an aromatic hydrocarbon-based organic solvent in addition to the carbonate-based solvent. The aromatic hydrocarbon-based organic solvent may use an aromatic hydrocarbon-based compound.

Specific examples of the aromatic hydrocarbon-based organic solvent include benzene, fluorobenzene, chlorobenzene, nitrobenzene, toluene, fluorotoluene, trifluorotoluene, xylene and the like. In the electrolyte including the aromatic hydrocarbon-based organic solvent, the volume ratio of the carbonate-based solvent to the aromatic hydrocarbon-based organic solvent may be 1:1 to 30:1, as a non-limiting example. When the carbonate-based solvent and the aromatic hydrocarbon-based organic solvent are mixed at the above-mentioned volume ratio, a desirable performance of the electrolyte is obtained.

Furthermore, the electrolyte comprises a lithium salt. The lithium salt acts as the source of lithium ions inside the battery, enabling the basic operation of the lithium battery. The lithium salt may include one or more selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ (wherein, x and y are natural numbers) and $LiSO_3CF_3$, or mixtures thereof.

The lithium salt may be used at density within the range of 0.6 to 2.0M, or more specifically, within the range of 0.7 to 1.6M. When the density of the lithium salt is less than 0.6M, the viscosity of the electrolyte may be low so that the performance of the electrolyte deteriorates. When the density of the lithium salt is in excess of 2.0M, the viscosity of the electrolyte increases so that the mobility of lithium ions decreases.

As described above, when the porous layer comprising the ceramic material and the binder is formed on the positive electrode, the negative electrode or both positive and negative electrodes, the two electrodes are stacked or stacked and thereafter wound, to form the electrode assembly. Subsequently, the electrode assembly is inserted into a can or a container similar to a can, and the electrolyte is injected into the can or the container to manufacture the lithium secondary battery.

Aspects of the present invention will be described with reference to the embodiments and comparative examples. However, the embodiments are only preferred embodiments of the present invention and therefore the scope of the invention is not limited to the disclosed embodiments.

Embodiment 1

$LiCoO_2$ was used as a positive electrode active material, polyvinylidene fluoride (PVDF) was used as a binder, and carbon was used as an electric conduction material. After $LiCoO_2$, PVDF and carbon were mixed in a weight ratio of 92:4:4, the mixture was dispersed in N-methyl-2-pyrrolidone, to form a positive electrode slurry. An aluminum foil that was 20 μm thick was coated with the slurry, dried and rolled, to form a positive electrode. Artificial graphite was used as a negative electrode active material, styrene-butadiene rubber (SBR) was used as a binder, and carboxymethyl cellulose was used as a thickener. After artificial graphite, SBR and carboxymethyl cellulose were mixed in a weight ratio of 96:2:2, the mixture was dispersed in water, to form negative electrode active material slurry. A copper foil that was 15 μm thick was coated with the slurry, dried and rolled, to form a negative electrode.

Barium titanate ($BaTiO_3$) is used as a ceramic material and styrene-butadiene rubber (SBR) is used as a binder. After the $BaTiO_3$ and SBR were mixed, the mixture was diluted in a mixed solvent of N-methyl-2-pyrrolidone and cyclohexanone to form paste for a porous layer. The negative electrode was coated with the paste to form the porous layer between the positive electrode and the negative electrode to form a separator. The positive electrode, separator and negative electrode were wound and pressed and inserted into a cylindrical can.

An electrolyte was injected into the cylindrical can to manufacture a lithium secondary battery.

Embodiment 2

$LiCoO_2$ was used as a positive electrode active material, polyvinylidene fluoride (PVDF) was used as a binder, and carbon was used as an electric conduction material. After the $LiCoO_2$, PVDF and carbon were mixed in a weight ratio of 92:4:4, the mixture was dispersed in N-methyl-2-pyrrolidone to form positive electrode slurry. An aluminum foil 20 μm thick was coated with the slurry, dried and rolled to form a positive electrode. Artificial graphite was used as a negative electrode active material, styrene-butadiene rubber (SBR) was used as a binder, and carboxymethyl cellulose was used as a thickener. After artificial graphite, SBR and carboxymethyl cellulose were mixed in a weight ratio of 96:2:2, the mixture was dispersed in water to form a negative electrode active material slurry. A copper foil 15 μm thick was coated with the slurry, dried and rolled, to form a negative electrode.

A mixture of barium titanate ($BaTiO_3$) and alumina ($Al_2O_3$) was used as a ceramic material and styrene-butadiene rubber (SBR) was used as a binder. After the mixture of $BaTiO_3$ and $Al_2O_3$ and SBR was prepared, the mixture was diluted in a mixed solvent of N-methyl-2-pyrrolidone and cyclohexanone, to form a paste for a porous layer. The negative electrode was coated with the paste to form the porous layer between the positive electrode and the negative electrode to form a separator. The positive electrode, separator and negative electrode were wound and pressed and inserted into a cylindrical can.

The amount of barium titanate ($BaTiO_3$) being used was 90 wt %, based on the total amount of the ceramic material.

An electrolyte was injected into the cylindrical can to manufacture a lithium secondary battery.

Embodiment 3

Embodiment 3 was performed in the same manner as Embodiment 2, except that the amount of barium titanate ($BaTiO_3$) was 70 wt %, based on the total amount of the ceramic material.

Embodiment 4

Embodiment 4 is performed in the same manner as Embodiment 2, except that the amount of barium titanate ($BaTiO_3$) was 60 wt %, based on the total amount of the ceramic material.

Comparative Example 1

Comparative Example 1 was performed in the same manner as Embodiment 1, except that a polyethylene resin layer, instead of the porous layer resulting from the combination of the ceramic material and the binder, was used as a separator.

Comparative Example 2

Comparative Example 2 was performed in the same manner as Embodiment 1, except that alumina ($Al_2O_3$) was used as the ceramic material.

Comparative Example 3

Comparative Example 3 was performed in the same manner as Embodiment 2, except that the amount of barium titanate ($BaTiO_3$) was 10 wt %, based on the total amount of the ceramic material.

Comparative Example 4

Comparative Example 4 was performed in the same manner as Embodiment 2, except that the amount of barium titanate ($BaTiO_3$) was 30 wt %, based on the total amount of the ceramic material.

Comparative Example 5

Comparative Example 5 was performed in the same manner as Embodiment 2, except that the amount of barium titanate ($BaTiO_3$) was 50 wt %, based on the total amount of the ceramic material.

Measurements were performed with respect to characteristics of an internal short circuit in lithium batteries according to Embodiments 1 through 4 and Comparative Examples 1 through 5. The internal short circuit characteristics were measured by a nail perforation test. Specifically, the nail perforation test was conducted under the conditions that the perforation speed of a nail pin was 5 mm/s and the thickness of the nail pin to perforate was 2.5 mm. The test was conducted five times in each of the Embodiments and Comparative Examples and the results of the test are indicated. Specific symbols used to indicate the results are as follows: L0 indicates that no change occurred; L1 indicates that a leakage occurred; L2 indicates that a surface temperature was below 200° C. and smoke was generated; L3 indicates that a surface temperature was above 200° C. and smoke was generated; L4 indicates that the battery caught fire; and L5 indicates that the battery exploded or burst. For example, 4L1 means that four lithium batteries were on level L1.

Further, measurements were performed with respect to collision characteristics in lithium batteries according to Embodiments 1 through 4 and Comparative Examples 1 through 5. The collision characteristics were measured by using a lithium battery of a standard charging state. A lithium battery was positioned to be level on a flat steel plate, and a round bar having a regular diameter (7.9 mm) was placed on the battery so as to be perpendicular to each other in the axial direction. A weight having predetermined mass (9.1 kg) was allowed to free fall from a predetermined height (610±25 mm) above the round bar, causing the collision between the round bar and the battery. Then, a thermocouple thermometer was attached to the surface of the battery, to measure changes in the surface temperatures of the batteries and changes in the batteries after the collision. The test was conducted five times in each of the Embodiments and Comparative Examples and the results of the test are indicated. Specific symbols of the results are as follows: L0 indicates that no change occurred; L1 indicates that a leakage occurred; L2 indicates that a surface temperature was below 200° C. and smoke was generated; L3 indicates that a surface temperature was above 200° C. and smoke was generated; L4 indicates that the battery caught fire; and L5 indicates that the battery exploded or burst. For example, 4L1 means that four lithium batteries were on the level of L1.

Further, measurements were performed with respect to characteristics of thermal exposure in lithium batteries according to Embodiments 1 through 4 and Comparative Examples 1 through 5. The thermal exposure characteristics wee measured by placing a lithium ion secondary battery of a standard charging state in a chamber, increasing the temperature from room temperature to 150° C., at a temperature increase speed of 5° C. per minute, and maintaining the temperature of 150° C., to observe changes in the batteries. Then, a point in time at which lithium batteries caught fire was measured.

The results of the above measurements are indicated in Table 1 below:

TABLE 1

| | Separator constitution | Amount of barium titanate (wt %) | Internal short circuit characteristics | Collision characteristics | Thermal exposure characteristics |
|---|---|---|---|---|---|
| Embodiment 1 | Barium titanate | 100 | 3L1, 2L4 | 5L0 | Fire after 23 minutes |
| Embodiment 2 | Mixture of barium titanate and alumina | 90 | 3L1, 2L4 | 5L0 | Fire after 23 minutes |

TABLE 1-continued

|  | Separator constitution | Amount of barium titanate (wt %) | Internal short circuit characteristics | Collision characteristics | Thermal exposure characteristics |
|---|---|---|---|---|---|
| Embodiment 3 | Mixture of barium titanate and alumina | 70 | 4L1, 1L4 | 5L0 | Fire after 23 minutes |
| Embodiment 4 | Mixture of barium titanate and alumina | 60 | 4L1, 1L4 | 5L0 | Fire after 23 minutes |
| Comparative Example 1 | Polyethylene resin layer | — | 5L4 | 4L1, 1L4 | Fire after 16 minutes |
| Comparative Example 2 | Alumina | 0 | 2L1, 3L4 | 3L0, 2L1 | Fire after 17 minutes |
| Comparative Example 3 | Mixture of barium titanate and alumina | 10 | 1L1, 4L4 | 2L0, 3L1 | Fire after 16 minutes |
| Comparative Example 4 | Mixture of barium titanate and alumina | 30 | 1L1, 4L4 | 3L0, 2L1 | Fire after 17 minutes |
| Comparative Example 5 | Mixture of barium titanate and alumina | 50 | 2L1, 3L4 | 5L0 | Fire after 20 minutes |

As shown in Table 1, in Embodiments 1 through 4, 3 or more among 5 lithium batteries were L1 or higher with respect to the internal short circuit characteristics and were very excellent with respect to the collision characteristics. Furthermore, these lithium batteries showed excellent thermal exposure characteristics by lasting for 23 minutes or more under the severe thermal exposure conditions of 150° C.

Specifically, Embodiment 1, where only barium titanate was used as the ceramic material, showed characteristics comparable to other Embodiments where the mixture of barium titanate and alumina was used as the ceramic material.

However, in Comparative Example 1, where the polyethylene resin layer was used, and in Comparative Example 2, where only alumina was used as the ceramic material, the internal short circuit characteristics were not good and the thermal exposure characteristics were not very good.

Moreover, in Comparative Examples 3 and 4, where a small amount of barium titanate was used, the internal short circuit characteristics and the thermal exposure characteristics were not good. Comparative Example 5, where 50 wt % barium titanate was used showed better effects than the other Comparative Examples but had insufficient effects compared to Embodiment 4 where 60 wt % barium titanate is used.

Accordingly, i when only barium titanate ($BaTiO_3$) was used as the ceramic material or when the mixture of barium titanate ($BaTiO_3$) and a conventional ceramic material was used, the amount of barium titanate ($BaTiO_3$) to be used was more than 50 wt % and less than 100 wt %, compared with the total amount of the ceramic material to improve the stability of the battery.

Tests were conducted with respect to the performance of a battery, using the lithium batteries of Embodiment 3, Comparative Examples 1 and 2.

3V cutoff discharging of the lithium batteries of Embodiment 3, Comparative Examples 1 and 2 was performed in the CC mode, to measure the high rate discharging capacity (%) (2C discharging capacity/0.2C discharging capacity×100).

Further, after 4.2V cutoff charging of the lithium batteries of Embodiment 3, Comparative Examples 1 and 2 was performed at the charging/discharging speed of 0.8C at room temperature (23 to 25° C.), 2.75V cutoff discharging thereof was performed 500 times, at the charging/discharging speed of 1 C, to calculate a capacity maintenance rate to measure the life characteristics (%) of the batteries.

Further, 3V discharging of the lithium batteries of Embodiment 3, Comparative Examples 1 and 2 was performed at the charging/discharging speed of 0.8C at 0° C., to measure the low-temperature discharging capacity (%).

The results of the above measurement are indicated in Table 2 below:

TABLE 2

|  | Separator constitution | Amount of barium titanate (wt %) | High rate discharging capacity (%) | Life characteristics (%) | Low-temperature discharging capacity (%) |
|---|---|---|---|---|---|
| Embodiment 3 | Mixture of barium titanate and alumina | 70 | 99.5 | 91.0 | 75.1 |
| Comparative Example 1 | Polyethylene resin layer | — | 98 | 85.1 | 72.8 |
| Comparative Example 2 | Alumina | 0 | 98.5 | 89.9 | 70.7 |

As shown in Table 2, the battery of Embodiment 3, where ferroelectric barium titanate was used as the ceramic material, showed the a 1% or more increase with respect to the high rate discharging capacity and the life characteristics and a 2% or more increase with respect to the low-temperature discharging capacity, compared to the battery Comparative Example 1, where the polyethylene resin layer was used as the separator, and the battery of Comparative Example 2, where only alumina is used as the ceramic material.

Accordingly, aspects of the present invention improve the performance of the battery, by using the porous layer formed by the combination of the ceramic material and the binder as the separator and by using the ferroelectric material as the ceramic material.

The lithium secondary battery comprising the separator according to aspects of the present invention provides an increase in the ion conductivity to improve the performance of the battery by using barium titanate ($BaTiO_3$), which is a ferroelectric material, as the ceramic material forming the separator.

Furthermore, the lithium secondary battery comprising the separator according to aspects of the present invention show an improvement in the safety of the battery due to the characteristics of barium titanate ($BaTiO_3$) which loses dielectric properties at 120° C. or more and which undergoes an endothermic reaction at about 120° C.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly, comprising:
   a positive electrode including a positive electrode active material;
   a negative electrode including a negative electrode active material; and
   a separator separating the positive electrode and the negative electrode from each other,
   wherein the separator comprises a porous layer comprising a combination of a ceramic material and a binder, wherein the ceramic material is 80 to 95 weight % of the combination, and wherein the ceramic material is barium titanate ($BaTiO_3$).

2. The electrode assembly according to claim 1, wherein the binder is a synthetic rubber-based latex-type binder or acryl-based rubber having a cross-linked structure.

3. An electrode assembly, comprising:
   a positive electrode including a positive electrode active material;
   a negative electrode including a negative electrode active material; and
   a separator separating the positive electrode and the negative electrode from each other,
   wherein the separator comprises a porous layer comprising a combination of a first ceramic material, a second ceramic material and a binder, wherein the first ceramic material is 80 to 95 weight % of the combination, and wherein the first ceramic material is barium titanate ($BaTiO_3$).

4. The electrode assembly according to claim 3, wherein the amount of the first ceramic material is more than 50 wt % and less than 100 wt %, based on the total amount of the ceramic material.

5. The electrode assembly according to claim 3, wherein the second ceramic material is at least one material selected from the group consisting of silica ($SiO_2$), alumina ($Al_2O_3$), zirconium oxide (ZrO2) and titanium oxide ($TiO_2$).

6. The electrode assembly according to claim 3, wherein the second ceramic material is at least one material selected from the group of an insulating nitride, a hydroxide and a ketone compound of one of zirconium, aluminum, silicon or titanium, or a mixture of the compounds.

7. The electrode assembly according to claim 3, wherein the binder is a synthetic rubber-based latex-type binder or acryl-based rubber having a cross-linked structure.

8. The electrode assembly according to claim 3, wherein the separator further comprises a polyolefin-based resin layer.

9. A lithium secondary battery comprising:
   a positive electrode,
   a negative electrode,
   a separator separating the positive electrode and the negative electrode from each other and
   an electrolyte:
   wherein, the separator comprises a porous layer comprising a combination of a ceramic material and a binder, wherein the ceramic material is 80 to 95 weight % of the combination and wherein the ceramic material is barium titanate ($BaTiO_3$).

10. The lithium secondary battery according to claim 9, wherein the binder is a synthetic rubber-based latex-type binder or acryl-based rubber having a cross-linked structure.

11. A lithium secondary battery comprising:
    a positive electrode,
    a negative electrode,
    a separator separating the positive electrode and the negative electrode from each other and
    an electrolyte,
    wherein, the separator comprises a porous layer comprising a combination of a first ceramic material, a second ceramic material and a binder, wherein the first ceramic material is 80 to 95 weight % of the combination, and wherein and the first ceramic material is barium titanate ($BaTiO_3$).

12. The lithium secondary battery according to claim 11, wherein the amount of the first ceramic material is more than 50 wt % and less than 100 wt %, based on the total amount of the ceramic material.

13. The lithium secondary battery according to claim 11, wherein the second ceramic material is at least one material selected from the group consisting of silica ($SiO_2$), alumina ($Al_2O_3$), zirconium oxide (ZrO2) and titanium oxide ($TiO_2$).

14. The lithium secondary battery according to claim 11, wherein the second ceramic material is at least one material selected from the group consisting of an insulating nitride, a hydroxide and a ketone compound of one of zirconium, aluminum, silicon or titanium, or a mixture of the compounds.

15. The lithium secondary battery according to claim 11, wherein the binder is a synthetic rubber-based latex-type binder or acryl-based rubber having a cross-linked structure.

16. The lithium secondary battery according to claim 11, wherein the separator further comprises a polyolefin-based resin layer.

17. The lithium secondary battery according to claim 11, wherein the electrolyte comprises a non-aqueous organic solvent and a lithium salt.

18. An electrode/separator structure comprising:
    an electrode including an electrode active material layer; and
    a separator formed on the electrode active material, including a porous layer comprising a ceramic material and a binder, wherein the ceramic material is 80 to 95 weight % of the porous layer and wherein the ceramic material is a material that undergoes a transition from being ferroelectric to being paraelectric at a temperature of about 120° C., and wherein the ceramic material is a material having a dielectric constant that decreases at a temperature of about 120° C. as the temperature increases.

19. An electrode/separator structure comprising:
    an electrode including an electrode active material layer; and
    a separator formed on the electrode active material, including a porous layer comprising a first ceramic material, a second ceramic material and a binder, wherein the first ceramic material is 80 to 95 weight % of the combination, and wherein the first ceramic material is a material that undergoes an endothermic reaction at a temperature of about 120° C. or greater.

* * * * *

UNITED STATES PATENT AND TRADEMARK OFFICE
CERTIFICATE OF CORRECTION

PATENT NO. : 8,182,947 B2
APPLICATION NO. : 12/412765
DATED : May 22, 2012
INVENTOR(S) : Hyo-Rim Bak

Page 1 of 1

It is certified that error appears in the above-identified patent and that said Letters Patent is hereby corrected as shown below:

At column 6, line 52, delete "electrodes. a" and insert -- electrodes. A --, therefor.

At column 6, line 67, delete "5 to 6V" and insert -- 5V to 6V --, therefor.

At column 11, line 60, before "when" delete "I", therefor.

At column 13, line 54, Claim 5, change "(ZrO2)" to -- $(ZrO_2)$ --, therefor.

At column 14, line 21, Claim 11, after "wherein" delete "and", therefor.

At column 14, line 29, Claim 13, change "(ZrO2)" to -- $(ZrO_2)$ --, therefor.

Signed and Sealed this
Twenty-third Day of October, 2012

David J. Kappos
*Director of the United States Patent and Trademark Office*